(12) United States Patent
Sakamoto et al.

(10) Patent No.: US 7,196,755 B2
(45) Date of Patent: Mar. 27, 2007

(54) REFLECTOR AND REFLECTION-TYPE LCD DEVICE USING THE SAME

(75) Inventors: Michiaki Sakamoto, Tokyo (JP); Yuichi Yamaguchi, Tokyo (JP); Hidenori Ikeno, Tokyo (JP); Fumihiko Matsuno, Tokyo (JP); Hironori Kikkawa, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 742 days.

(21) Appl. No.: 10/653,898

(22) Filed: Sep. 4, 2003

(65) Prior Publication Data

US 2004/0051828 A1    Mar. 18, 2004

Related U.S. Application Data

(62) Division of application No. 10/084,356, filed on Feb. 28, 2002, now Pat. No. 7,092,051.

(30) Foreign Application Priority Data

Feb. 28, 2001   (JP) .............................. 2001-055229

(51) Int. Cl.
G02F 1/1335     (2006.01)

(52) U.S. Cl. ..................................... 349/113
(58) Field of Classification Search ................ 349/113
See application file for complete search history.

(56) References Cited

U.S. PATENT DOCUMENTS

| | | | |
|---|---|---|---|
| 5,408,345 A * | 4/1995 | Mitsui et al. ................ 349/42 |
| 5,559,617 A * | 9/1996 | Mitsui et al. ................ 349/117 |
| 5,671,031 A * | 9/1997 | Nakamura et al. .......... 349/106 |
| 5,691,791 A * | 11/1997 | Nakamura et al. .......... 349/113 |
| 6,097,458 A | 8/2000 | Tsuda et al. |
| 6,278,507 B1 * | 8/2001 | Nakamura .................. 349/106 |
| 6,556,260 B1 * | 4/2003 | Itou et al. ..................... 349/69 |
| 6,654,093 B1 * | 11/2003 | Kim .......................... 349/179 |
| 6,831,717 B2 * | 12/2004 | Hanakawa et al. ......... 349/113 |
| 2004/0021810 A1 * | 2/2004 | Kawaguri et al. .......... 349/113 |
| 2004/0105646 A1 * | 6/2004 | Fukuda et al. .............. 385/129 |
| 2005/0174514 A1 * | 8/2005 | Iijima ......................... 349/109 |

FOREIGN PATENT DOCUMENTS

| | | |
|---|---|---|
| EP | 0 495 679 | 7/1992 |
| EP | 0 965 863 | 12/1999 |
| JP | 2825713 | 9/1998 |
| WO | WO 01/04695 | 1/2001 |

* cited by examiner

*Primary Examiner*—James A. Dudek
(74) *Attorney, Agent, or Firm*—Young & Thompson

(57) ABSTRACT

A reflector for a reflection-type LCD device is provided, which reflects efficiently incident light to the viewer's side and that suppresses the change of color tone. The reflector comprises a roughened surface having a protrusion pattern. The protrusion pattern gives inclination angle to the surface according to a specific distribution where a first component with an inclination angle value of 0° is 15% or less in area and a second component with an inclination angle value from 2° to 10° is 50% or greater in area. The protrusion pattern gives a variation range of chromaticity coordinates (x, y) on a chromaticity diagram dependent on an angle of view. The variation range is limited in a circle on the chromaticity diagram. The circle has a radius of approximately 0.05 and a center at a point corresponding to white color.

8 Claims, 14 Drawing Sheets

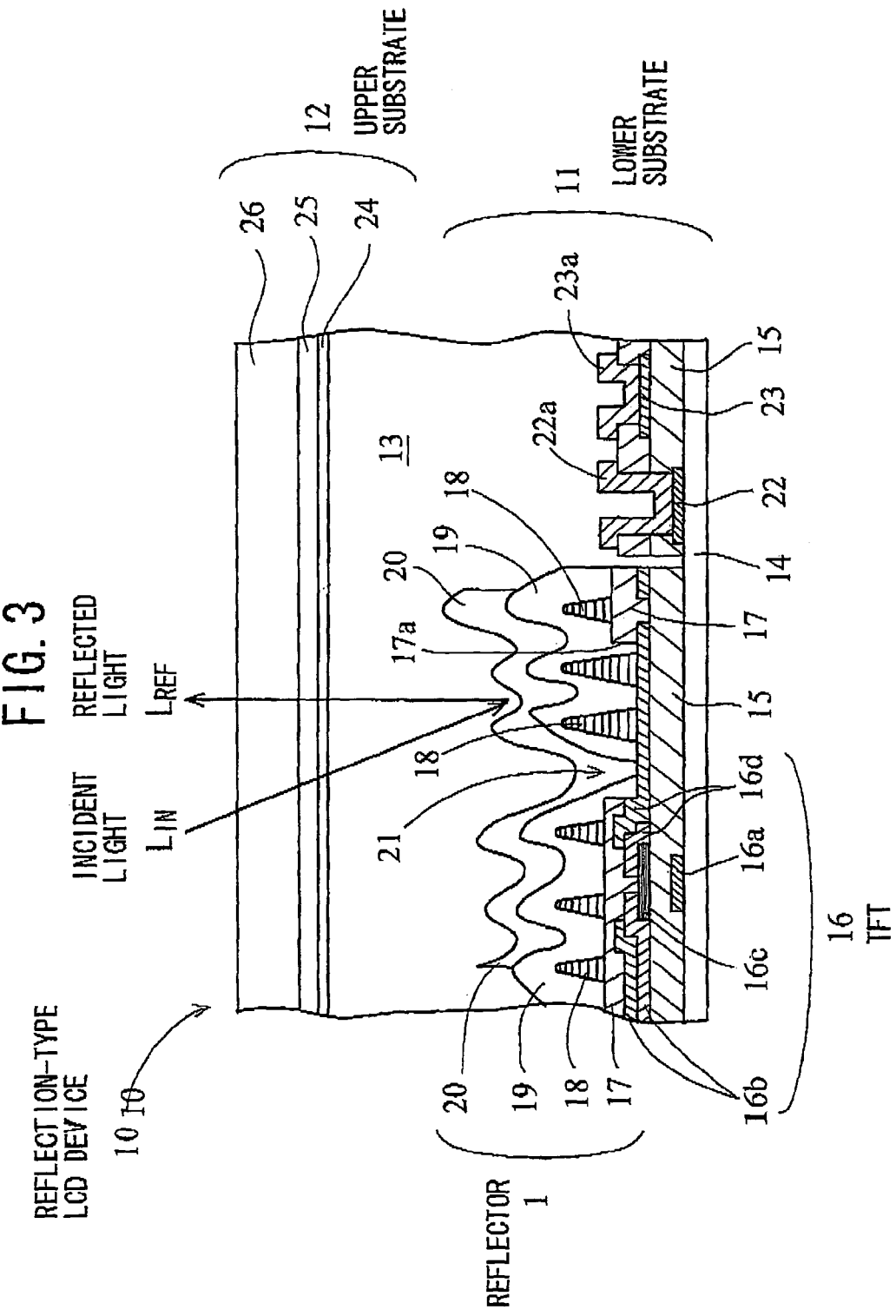

MEASURING CONDITION
REFERENCE: WHITE REFLECTOR, θ = 0, SLIT: 0.2, ND FILTER: NONE
SAMPLES: θ = 0 ~ 60°, SLIT: 0.2, ND FILTER: ATTACHED (ND = 3)

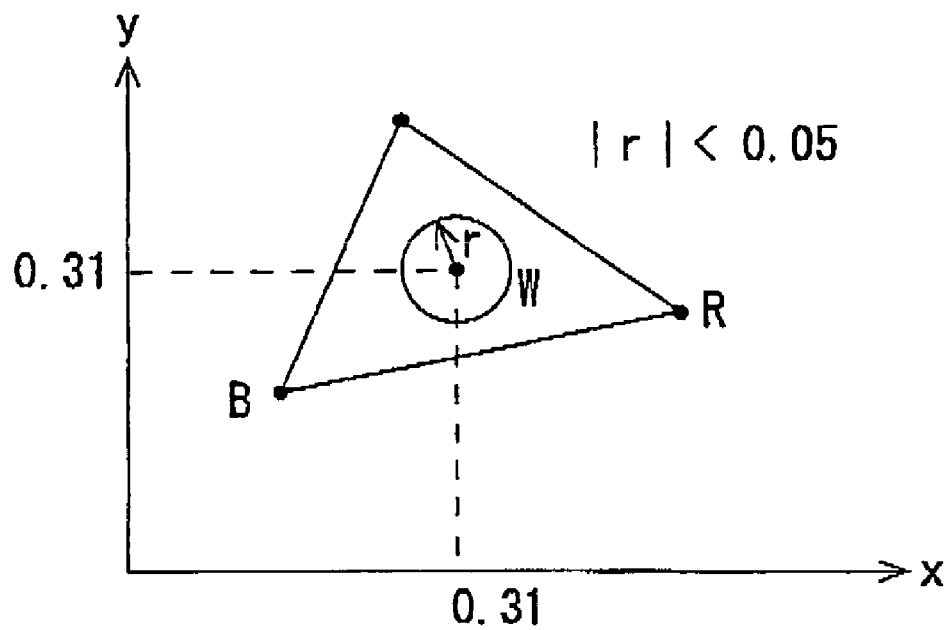

REFLECTOR AND REFLECTION-TYPE LCD DEVICE USING THE SAME

CROSS REFERENCE TO RELATED APPLICATION

This application is a division of application Ser. No. 10/084,356, filed on Feb. 28, 2002, now U.S Pat. No. 7,092,051, the entire contents of which are hereby incorporated by reference.

BACKGROUND OF THE INVENTION

1. Field of the Invention

The present invention relates to a reflection-type Liquid-Crystal Display (LCD) device. More particularly, the invention relates to a reflector for a reflection-type LCD device that forms its light source by reflecting external incident light, and a LCD device using the reflector.

2. Description of the Related Art

Conventionally, reflection-type LCD devices are known well. Reflection-type LCD devices have an advantage that the power consumption is low and the body is thin and light, compared with transmission-type LCD devices. This is because external light can be used for their light source by reflecting it with a built-in reflector, which eliminates the backlight. Thus, reflection-type LCD devices are mainly used for portable electronic terminals such as portable telephones.

The reflection-type LCD device comprises various modes or types, such as the twisted-nematic (TN) mode, the single polarizer type, the super twisted-nematic (STN) mode, the guest-host mode, the polymer-distributed liquid crystal (PDLC) type, and the cholesteric phase type. The basic configuration of the reflection-type LCD device comprises a liquid crystal layer, switching elements for driving the liquid crystal in the layer, and a reflector plate provided inside or outside the LCD cell.

With the LCD devices of these modes or types, the active-matrix addressing method using Thin-Film Transistors (TFTs) or Metal/Insulator/Metal (MIM) diodes as the switching elements is employed along with the reflector. This is because it generates high resolution and high quality of image.

An example of the reflection-type LCD devices is as follows:

An organic dielectric film is formed on a plate and then, the film is patterned by photolithography and etching processes, forming isolated protrusions on the surface of the plate. The protrusions are formed by the remaining organic film. An interlayer dielectric film is formed on the plate to cover the protrusions, making protrusions on the surface of the interlayer dielectric film, in other words, making a bumpy surface of the interlayer dielectric film. Thus, a reflector plate having protrusions on its surface is obtained.

The Japanese Patent No. 2825713 issued on Sep. 11, 1998, discloses another example of the reflection-type LCD devices. In this example, an organic dielectric film is formed over a plate and then, the film is patterned by photolithography and etching processes, forming protrusions on the surface of the film. Thereafter, a patterned metal film serving as a reflector electrode is formed on the dielectric film to cover the protrusions. Thus, a substrate with the reflector electrode whose surface is smoothly roughened is formed.

FIG. 1 is a plan view showing a prior-art plate-shaped reflector 101, in which protrusions 102 are formed on the surface of the reflector 101. As shown in FIG. 1, all the protrusions 102 are circular in plan shape and arranged to be isolated from each other.

The prior-art reflector 101 has a purpose of reflecting incident light while diffusing the same at a certain extent and therefore, the reflected light has large dispersion. Thus, the incident light is reflected in such a way that the reflected light is diffused within a conical region approximately uniformly, as shown in FIG. 2.

FIG. 2 shows the relationship between the incident light and the reflected light by the prior-art reflector plate 101. As seen from FIG. 2, the incident light $L_{IN}$ (e.g., a fluorescent lamp or the sunlight) is irradiated to the plate 101 in the viewing direction of a viewer. The light $L_{IN}$ irradiated is reflected by the plate 101, forming reflected light beams $L_{REF}$. The reflected beams $L_{REF}$ are approximately uniformly diffused by the reflector 101. Accordingly, the prior-art reflector 101 with the circular protrusions 102 has the following disadvantages.

First, when the prior-art reflector 101 is located in a situation (e.g., in a room) where direct light is dominant and indirect light is weak, part of the incident light $L_{IN}$ that propagates in a specific direction is not reflected efficiently toward the viewer. Here, the "direct light" is strong light emitted from a light source, such as a fluorescent lamp, and directly irradiated to the reflector 101 without reflection. The "indirect light" is light emitted from a light source, such as a fluorescent lamp, and indirectly irradiated to the reflector 101 after reflection at some positions (e.g., a wall). This means that the incident light $L_{IN}$ is not utilized effectively. As a result, the intensity of the reflected right $L_{REF}$ toward the viewer decreases, resulting in the viewer's feeling that images on the displaying screen is dark or is not sufficiently light.

Second, if the protrusions 102 of the reflector 101 have a specific geometric shape or arrangement pattern, there is a possibility that the color tone of images on the screen changes outstandingly according to the angle with respect to the LCD panel, the incident light $L_{IN}$, and the position of the viewer. This is due to the optical interference caused by the difference between the optical path lengths of the beams of the reflected light $L_{REF}$ (i.e., which positions of the roughening pattern for the reflector 101 the incident light beam is reflected at). As a result, there is a possibility that the displaying performance of the LCD device of this type degrades.

SUMMARY OF THE INVENTION

Accordingly, an object of the present invention is to provide a reflector for a reflection-type LCD device that reflects efficiently incident light to the viewer's side, and a reflection-type LCD device using the same.

Another object of the present invention is to provide a reflector for a reflection-type LCD device that suppresses optical interference effectively, and a reflection-type LCD device using the same.

Still another object of the present invention is to provide a reflector for a reflection-type LCD device that suppresses the change of color tone, and a reflection-type LCD device using the same.

A further object of the present invention is to provide a reflector for a reflection-type LCD device that is easily designed, and a reflection-type LCD device using the same.

The above objects together with others not specifically mentioned will become clear to those skilled in the art from the following description.

According to a first aspect of the invention, a reflector for a reflection-type LCD device is provided.

This reflector comprises a roughened surface having a protrusion pattern. The protrusion pattern gives inclination angle to the surface according to a specific distribution where a first component with an inclination angle value of 0° is 15% or less in area and a second component with an inclination angle value from 2° to 10° is 50% or greater in area.

With the reflector for a reflection-type LCD device according to the first aspect of the invention, the roughened surface has the protrusion pattern that gives inclination angle to the surface according to a specific distribution. The distribution is determined in such a way that the first component with an inclination angle value of 0° is 15% or less in area and the second component with an inclination angle value from 2° to 10° is 50% or greater in area.

Thus, the proportion of the reflected light traveling in a specific direction is increased. This means that the amount of the component of the reflected light that travels toward a viewer is increased. Accordingly, the incident light is efficiently reflected by the roughened surface of the reflector of the first aspect to the viewer's side.

In a preferred embodiment of the reflector according to the first aspect of the invention, the specific distribution of the inclination angle values of the roughened surface has an average value within a range from 2° to 6°.

In this embodiment, there is an additional advantage that the reflector can be fitted to a typical arrangement of light source in a circumstance or situation where the reflector is used, thereby optimizing the reflection efficiency.

In another preferred embodiment of the reflector according to the first aspect of the invention, the reflector further comprises protrusions arranged in such a way that depressed areas are formed among adjoining ones of the protrusions, a first bumpy layer formed to cover the protrusions, and a base layer of the reflector formed on the first layer. Each of the depressed areas has a closed geometric shape. The first layer has a bumpiness generated by the protrusions. The base layer has a bumpiness corresponding to the bumpiness of the first layer, thereby forming the protrusion pattern of the surface of the reflector.

In this embodiment, there is an additional advantage that the visibility is improved over the whole surface of the reflector, the reason of which is as follows:

The protrusions are arranged in such a way that the depressed areas, each of which has a closed geometric shape, are formed among adjoining ones of the protrusions. Moreover, the bumpiness of the first layer is generated by the protrusions. The bumpiness of the base layer corresponds to the bumpiness of the first layer, thereby forming the protrusion pattern of the surface of the reflector. As a result, the protrusion pattern of the surface of the reflector can be formed in such a way that protruding areas of the surface are distributed uniformly over the entire reflector.

It is preferred that the closed geometric shape of each of the depressed areas is like one selected from the group consisting of triangle, rectangular, and ellipse. In this case, there is an additional advantage that values of the protrusions and the depressed areas can be determined easily.

In still another preferred embodiment of the reflector according to the first aspect of the invention, each of the protrusions has a width W and a height D, where the width W and the height D have a relationship of $0.5 \leq (D/W) \leq 1.0$.

In this embodiment, the shape of the protrusions is properly determined by the ratio (D/W), which determines the curvature of the surfaces of the protrusions. Therefore, the distribution of the incident angle values can be easily designed in such a way that the amount of the component of the reflected light that travels toward a viewer is increased.

If the ratio (D/W) is greater than 1.0, the total area of the protrusions with the inclination angle value of 10° or greater is likely to be excessive. If the ratio (D/W) is less than 0.5, the total area of the protrusions with the inclination angle value of 2° or less is likely to be excessive. As a result, the second component with the inclination angle value from 2° to 10° will be less than 50% in area. This leads to the viewer's feeling that the screen of the LCD device is not sufficiently light.

In a further preferred embodiment of the reflector according to the first aspect of the invention, the first bumpy layer has a minimum height d and the protrusions have an inter-center distance L, where the minimum height d and the inter-center distance L have a relationship of $(1/20) \leq (d/L) \leq (1/5)$.

In this embodiment, the shape of the protrusions is properly determined by the ratio (d/L), which determines the curvature of the surfaces of the protrusions. Therefore, the distribution of the incident angle values can be easily designed in such a way that the amount of the component of the reflected light that travels toward a viewer is increased.

If the ratio (d/L) is greater than (1/5), the total area of the protrusions with the inclination angle value of 10° or greater is likely to be excessive. If the ratio (d/L) is less than (1/20), the total area of the protrusions with the inclination angle value of 2° or less is likely to be excessive. As a result, the second component with the inclination angle value from 2° to 10° will be less than 50% in area. This leads to the viewer's feeling that the screen of the LCD device is not sufficiently light.

In a still further preferred embodiment of the reflector according to the first aspect of the invention, each of the protrusions has a height D and the first bumpy layer has a minimum height d, where the height D and the minimum height d have a relationship of $(D/d) \leq 3$.

In this embodiment, the shape of the protrusions is properly determined by the ratio (D/d), which determines the curvature of the surfaces of the protrusions. Therefore, the distribution of the incident angle values can be easily designed in such a way that the amount of the component of the reflected light that travels toward a viewer is increased.

If the ratio (D/d) is greater than 3, the total area of the protrusions with the inclination angle value of 10° or greater is likely to be excessive. As a result, the second component with the inclination angle value from 2° to 10° will be less than 50% in area. This leads to the viewer's feeling that the screen of the LCD device is not sufficiently light.

In a still further preferred embodiment of the reflector according to the first aspect of the invention, the protrusions included in a single pixel have a single maximum value of height.

In this embodiment, since the protrusions included in a single pixel have a single maximum value of height, the first component with the inclination angle value of 0° of the protrusion pattern, which is typically located right above the top of the protrusion or the bottom of the depressed area, will be decreased in area. This leads to the viewer's feeling that the screen of the LCD device is not sufficiently light. Moreover, the distribution of the incident angle values can be easily designed in such a way that the amount of the component of the reflected light that travels toward a viewer is increased.

According to a second aspect of the invention, another reflector for a reflection-type LCD device is provided.

This reflector comprises a roughened surface having a protrusion pattern. The protrusion pattern gives a variation range of chromaticity coordinates (x, y) on a chromaticity diagram dependent on an angle of view. The variation range is limited in a circle on the chromaticity diagram. The circle has a radius of approximately 0.05 and a center at a point corresponding to white color.

With the reflector for a reflection-type LCD device according to the second aspect of the invention, the roughened surface has the protrusion pattern that gives a variation range of chromaticity coordinates (x, y) on the chromaticity diagram dependent on the angle of view. The variation range is limited in the circle on the chromaticity diagram. The circle has a radius of approximately 0.05 and a center at a point corresponding to white color.

Thus, optical interference can be suppressed effectively. This means that the variation of color tone due to optical interference can be suppressed. Moreover, the optical characteristics of the reflector can be easily known with a measuring apparatus, not with labor, by way of measuring the variation of chromaticity coordinates (x, y) on the chromaticity diagram.

In a preferred embodiment of the reflector according to the second aspect of the invention, the reflector further comprises protrusions arranged in such a way that depressed areas are formed among adjoining ones of the protrusions, a first bumpy layer formed to cover the protrusions, and a base layer of the reflector formed on the first layer. Each of the depressed areas has a closed geometric shape. The first layer has a bumpiness generated by the protrusions. The base layer has a bumpiness corresponding to the bumpiness of the first layer, thereby forming the protrusion pattern of the surface of the reflector.

In this embodiment, because of the same reason as shown in the reflector of the first aspect, there is an additional advantage that the visibility is improved over the whole surface of the reflector.

It is preferred that the closed geometric shape of each of the depressed areas is like one selected from the group consisting of triangle, rectangular, and ellipse. In this case, there is an additional advantage that values of the protrusions and the depressed areas can be determined easily.

In another preferred embodiment of the reflector according to the second aspect of the invention, the first bumpy layer has a minimum height d and the protrusions have an inter-center distance L, where the minimum height d and the inter-center distance L have a relationship of $(1/15) \leq (d/L)$.

In this embodiment, the shape of the protrusions is properly determined by the ratio (d/L), which determines the curvature of the surfaces of the protrusions. Therefore, the distribution of the incident angle values can be easily designed in such a way that the amount of the component of the reflected light that travels toward a viewer is increased.

If the ratio (d/L) is greater than (1/15), the inclination angle value is increased and the curvature of the protrusions is decreased. Thus, the positional dispersion of the bright spots or bright regions will be small, which means that the dispersion of the wavelength is unable to be cancelled as desired. As a result, the change of color tone will be conspicuous.

In still another preferred embodiment of the reflector according to the second aspect of the invention, the protrusion pattern gives a specific distribution of inclination angle values to the surface. When incident light is irradiated to the surface of the reflector, bright regions with specific extent are generated, each of which has an inclination angle value within a range from 2° to 6°.

In this embodiment, when incident light is irradiated to the surface of the reflector, the bright regions with specific extent are generated. Each of the regions has an inclination angle value within a range from 2° to 6°. Thus, the regions can be arranged in such a way as to cover or compensate the wavelength variation of the reflected light corresponding to the change of color tone thereof. This means that the distribution of the inclination angle values can be easily designed or determined to suppress the change of color tone dependent on the angle of view.

It is preferred that the bright regions include a closest bright region.

In a further preferred embodiment of the reflector according to the second aspect of the invention, when minimum and maximum distances between the protruding bright region and the adjoining depressed bright region are defined as $L_{min}$ and $L_{max}$, respectively, and a mean distance between the protruding and depressed bright regions is defined as $L_{mean} = (L_{min} + L_{max})/2$, a relationship of $$(L_{min} - L_{max})/L_{mean} \geq 0.2$$

is established.

In this embodiment, the regions can be surely arranged in such a way as to cover or compensate the wavelength variation of the reflected light corresponding to the change of color tone thereof. Thus, the distribution of the inclination angle values can be easily designed or determined to suppress the change of color tone dependent on the angle of view.

It is preferred that the closed geometric shape of each of the depressed areas is like one selected from the group consisting of triangle, rectangular, and ellipse. In this case, there is an additional advantage that values of $L_{min}$, $L_{max}$, and $L_{mean}$ can be determined easily.

According to a third aspect of the invention, a reflection-type LCD device is provided. This device comprises one of the reflectors according to the first and second aspects of the invention described above.

With the reflection-type LCD device according to the third aspect of the invention, since one of the reflectors according to the first and second aspects of the invention is used, desired brightness is obtainable in typical situations of use of the device and/or the change of color tone dependent on the angel of view is suppressed.

BRIEF DESCRIPTION OF THE DRAWINGS

In order that the present invention may be readily carried into effect, it will now be described with reference to the accompanying drawings.

FIG. 3 is a schematic, partial cross-sectional view showing the configuration of a reflection-type LCD device according to an embodiment of the invention, in which the partial configuration corresponding to one of the pixels is mainly shown.

FIG. 13 is a graph showing the permissible range of the color coordinates (x, y) of the reflector according to the embodiment of the invention.

DETAILED DESCRIPTION OF THE PREFERRED EMBODIMENTS

Figure 1:
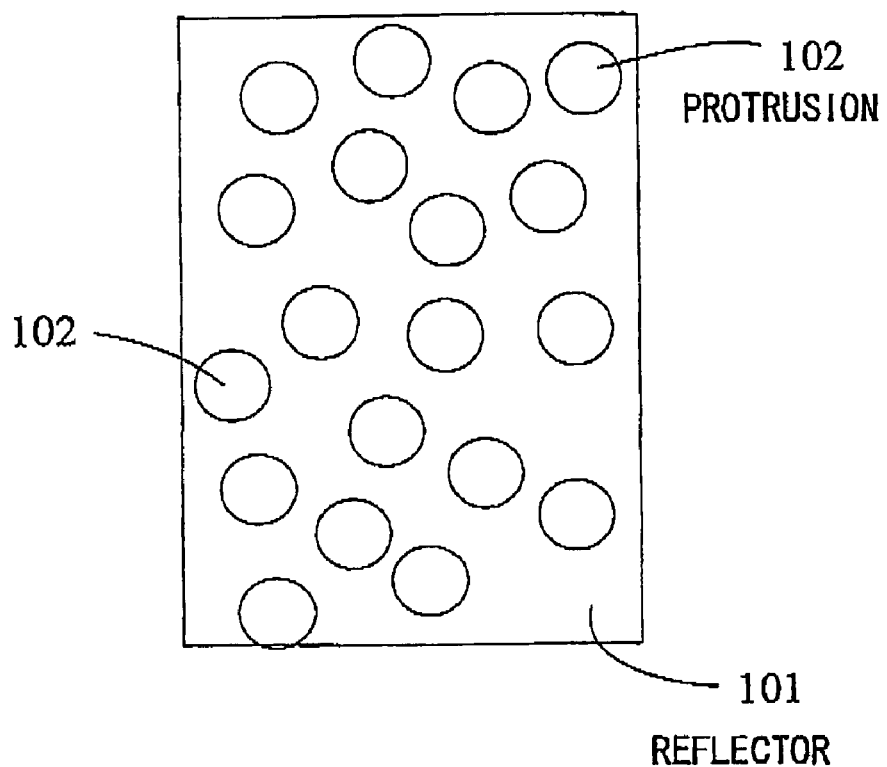
FIG. 1 is a schematic plan view showing a prior-art reflector having protrusions on its surface.
Figure 2:
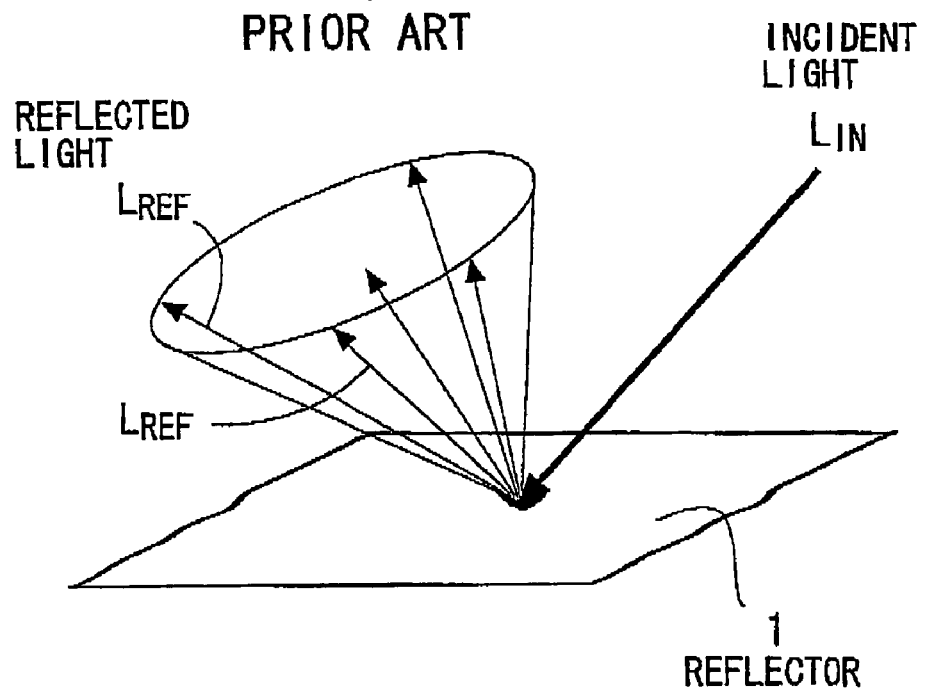
FIG. 2 is a schematic view showing the relationship between the incident light and the reflected light by the prior-art reflector of FIG. 1.

Preferred embodiments of the present invention will be described in detail below while referring to the drawings attached.

A reflection-type LCD device 10 according to an embodiment of the invention has the configuration as shown in FIG. 3, in which the structure corresponding to one of the pixels is illustrated. As seen from FIG. 3, this device 10 comprises a lower substrate 11, an opposite or upper substrate 12 located to be opposite to the lower substrate 11, and a liquid-crystal (LC) layer 13 sandwiched by the substrates 11 and 12.

The LCD device 10 includes thin-film transistors (TFTs) 16 as the switching elements for turning on and off the respective pixels. This means that the device 10 adopts the active-matrix addressing method. For the sake of simplification of description, only one TFT 16 is shown in FIG. 3. However, it is needless to say that the device 10 has a plurality of TFTs 16 arranged in a matrix array.

The lower substrate 11 comprises a dielectric plate 14, a dielectric protection layer 15, the TFTs 16, a first dielectric layer 17, approximately conical protrusions 18, a second dielectric layer 19, reflector electrodes 20, and contact holes 21. Since the TFTs 16 are formed on the substrate 11, the substrate 11 may be termed the "TFT substrate".

The dielectric protection layer 15 is formed on the dielectric plate 14. The TFTs 16 are formed regularly on the plate 14. Each of the TFTs 16 has a gate electrode 16a, a drain electrode 16b, a patterned semiconductor layer 16c, and a source electrode 16d. The gate electrode 16a is formed on the plate 14. The drain electrode 16b is formed on the protection layer 15 that covers the gate electrode 16a. The semiconductor layer 16c is formed on the protection layer 15 to be entirely overlapped with the gate electrode 16a. The source electrode 16d is formed on the protection layer 15 to be apart from the drain electrode 16b. The semiconductor layer 16c is located between the drain and source electrodes 16b and 16d to be contacted with them.

The first dielectric layer 17, which is formed to cover the TFTs 16, has penetrating contact holes 17a that expose the corresponding source electrodes 16d. The protrusions 18 are located on the layer 17 and the exposed source electrodes 16d in such a way as to be isolated from each other.

The second dielectric layer 19 is formed on the first dielectric layer 17 and the exposed source electrodes 16d to cover the protrusions 18. Because of the existence of the underlying protrusions 18, the layer 19 has specific protrusions (i.e., a specific unevenness) on its surface; in other words, the surface of the layer 19 is bumpy. The layer 19 has the contact holes 21 that expose the corresponding source electrodes 16d while none of the protrusions 18 are exposed.

The reflector electrodes 20 are formed on the second dielectric layer 19 to be overlapped with the TFTs 16 and the contact holes 21 of the layer 19. The electrodes 20 are contacted with and electrically connected to the corresponding source electrodes 16d by way of the corresponding contact holes 21. Each of the electrodes 20 serves as a reflector and a pixel electrode.

In the terminal area of the lower substrate 11, which is located in the periphery of the substrate 11, gate terminals 22 and drain terminals 23 are formed. The gate terminals 22, which are located on the plate 14, are contacted with and electrically connected to corresponding, overlying scan lines 22a. The drain terminals 23, which are located on the protection layer 15, are contacted with and electrically connected to corresponding, overlying data lines 23a.

The opposing, upper substrate 12 comprises a transparent electrode 24, a color filter 25, and a transparent, dielectric plate 26. The filter 25 is formed on the plate 26. The electrode 24 is formed on the filter 25. Since the filter 25 is formed on the substrate 12, the substrate 12 may be termed the "color filter substrate".

The lower and upper substrates 11 and 12 are fixed together at a specific distance. The LC layer 13 is located in the gap formed by the substrates 11 and 12.

Incident light $L_{IN}$, which is irradiated from the outside of the LCD device 10 to the upper substrate 12, penetrates the substrate 12 to enter the LC layer 13. Then, the light $L_{IN}$ reaches the reflector electrode 20 of the lower substrate 11 by way of the layer 13 and then, reflected toward the substrate 12. Thus, the reflected light $L_{REF}$ is generated. The reflected light $L_{REF}$ thus generated travels through the LC layer 13 and the substrate 12 and then, goes out of the device 10.

In the device 10, the protrusions 18, the second dielectric layer 19, and the reflector electrode 20 constitute a reflector of the embodiment. However, the reflector may have any other structure than this.

Next, a method of fabricating the LCD device 10 of FIG. 3 is explained below with reference to FIG. 4.

Figure 4A:
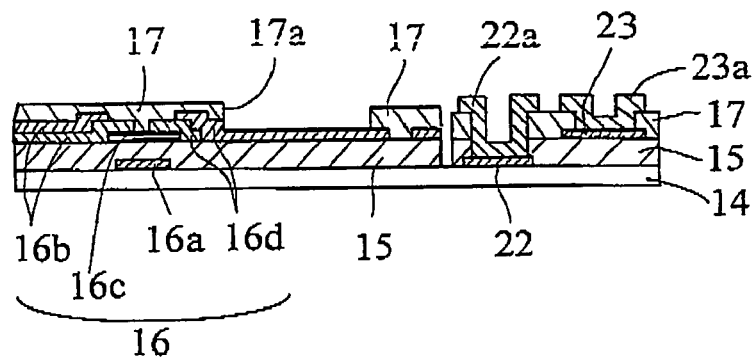
FIGS. 4A to 4D are schematic, partial cross-sectional views showing the process steps of a method of fabricating the reflection-type LCD device according to the embodiment of FIG. 3, respectively.

First, as shown in FIG. 4A, the TFTs 16 as the switching elements are formed on the dielectric plate 14 of the lower substrate 11 by a known method.

Specifically, the gate electrodes 6a are formed on the plate 14 and then, the dielectric protection layer 15 is formed on the plate 14 to cover the gate electrodes 16a. Thereafter, the semiconductor layers 16c are formed on the layer 15 to be overlapped with the corresponding gate electrodes 16a. Furthermore, the drain and source electrodes 16b and 16c are formed on the layer 15 to contact with the corresponding semiconductor layers 16c, resulting in the TFTs 16. Finally, the first dielectric layer 17 is formed to cover the TFTs 16 thus formed and then, the contact holes 17a are formed to penetrate the same. The source electrodes 16d are exposed from the layer 17 by way of the holes 17a. The state at this stage is shown in FIG. 4A.

The surface of the first dielectric layer 17 is planarized according to the necessity.

Needless to say, the TFT 16 may be replaced with any other switching element, such as a diode.

Figure 4B:
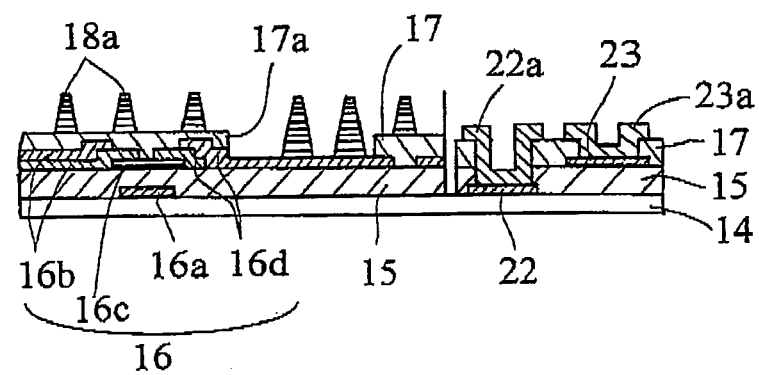

Subsequently, an organic resin layer (not shown) for the protrusions 18 is formed by a coating process on the first dielectric layer 17 and the exposed source electrodes 16d. The organic resin layer thus formed is then patterned by known optical exposure and development methods. Thus, frustum-shaped protrusions 18a are formed on the first dielectric layer 17 and the exposed source electrodes 16d. The state at this stage is shown in FIG. 4B.

Figure 4C:
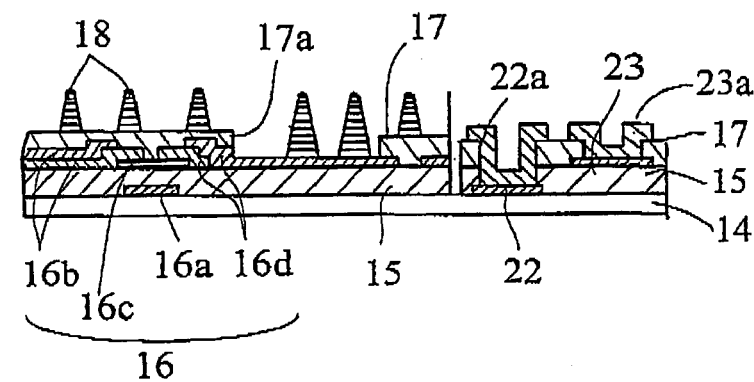

Thereafter, the frustum-shaped protrusions 18a, which are made of the remaining organic resin layer, are subjected to a sintering process at a specific high temperature. Through this process, the top corners of the protrusions 18a are rounded. As a result, the protrusions 18 are made approximately conical. The state at this stage is shown in FIG. 4C.

Figure 4D:
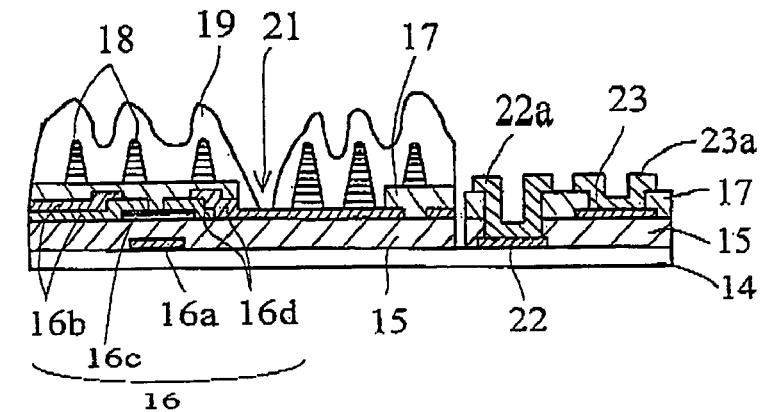

An organic resin layer (not shown) serving as an interlayer dielectric layer is formed by a coating process to cover the protrusions 18 and then, the contact holes 21 are formed in the organic resin layer thus formed by known optical exposure and development methods. Thereafter, the organic resin layer is subjected to a sintering process at a specific high temperature, thereby forming the second dielectric layer 19. The state at this stage is shown in FIG. 4D.

Thereafter, an aluminum (Al) film (not shown) is formed on the second dielectric layer 19 with the contact holes 21 and then, is patterned to form the reflector electrodes 20, as shown in FIG. 1. The Al film may be replaced with any other conductive film. Each of the electrodes 20 includes protrusions or unevenness according to the underlying protrusions 18.

Subsequently, the lower and upper substrates 11 and 12 are coupled together at a specific distance and specific liquid crystal is injected into the space between the substrate 11 and 12, forming the LC layer 13. Thus, the configuration of FIG. 3 is obtained.

In the above-described method, the protrusions 18 are formed by pattering the organic resin layer. However, the protrusions 18 may be formed by patterning two or more stacked organic resin layers.

The plan shape of the protrusions 18 will change through the exposure and development processes for the organic resin layer for the protrusions 18 and the sintering process therefor. Thus, even if the plan shape of the protrusions 18 is triangular, diamond-shaped, elliptic, or the like, the difference of the plan shape of the protrusions 18 will not cause any substantial change of the resultant protrusions or unevenness of the reflector electrodes 20. Moreover, even if the plan shape of the protrusions 18 is rectangular, the change of the distance between the adjacent protrusions 18 will not cause any substantial change of the resultant protrusions or unevenness of the electrodes 20, regardless of the long sides of each rectangle being equal or not.

Figure 5A:
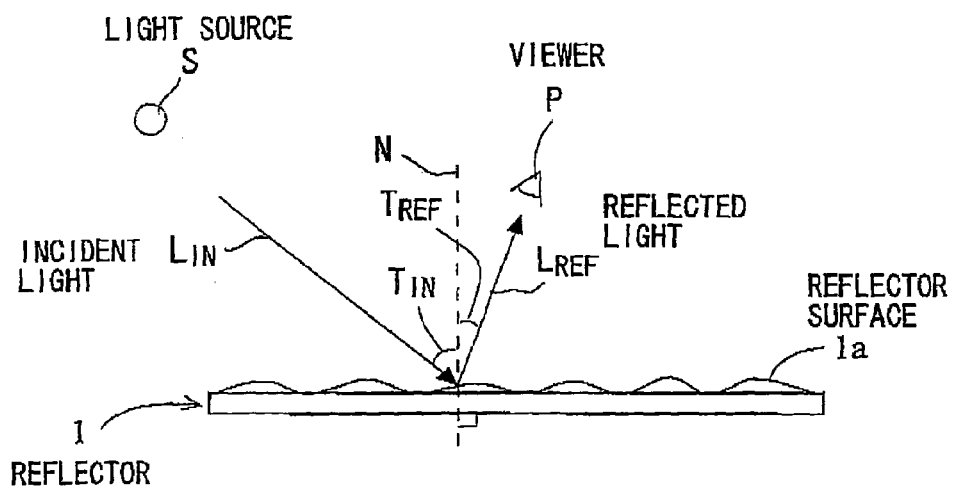
FIG. 5A is a schematic side view showing the relationship between the incident light and the reflected light by the reflector according to the embodiment of the invention.

FIG. 5A shows the state that the incident light $L_{IN}$ emitted from the light source S is reflected by the roughened or bumpy surface 1a of the reflector 1 according to the embodiment of the invention, thereby forming reflected light $L_{REF}$, and that the reflected light $L_{REF}$ thus formed is observed by the viewer P. The bumpy surface 1a of the reflector 1 is formed by the underlying protrusions 18 explained above.

The incident light $L_{IN}$ has an incident angle $T_{IN}$ defined as the angle between the incident light $L_{IN}$ and the normal N of the reflector 1. The reflected light $L_{REF}$ has a reflection angle $T_{REF}$ defined as the angle between the reflected light $L_{REF}$ and the normal of the reflector 1. Since the incident light $L_{IN}$ is reflected by the bumpy surface 1a of the reflector 1, the incident angle $T_{IN}$ is usually unequal to the reflection angle $T_{REF}$.

Figure 5B:
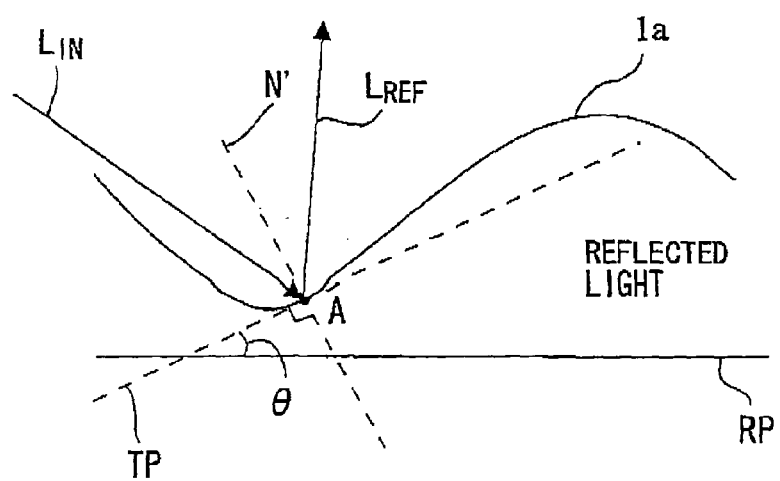
FIG. 5B is an enlarged, schematic side view showing the relationship between the incident light and the reflected light by the reflector according to the embodiment of the invention.

FIG. 5B schematically shows the enlarged state that the incident light $L_{IN}$ is reflected by the surface 1a of the reflector 1 according to the embodiment of the invention. When the incident light $L_{IN}$ is reflected at the point A on the surface 1a, it is reflected by the tangent plane TP of the surface 1a. Thus, the reflected light $L_{REF}$ is formed symmetrically with respect to the normal N' of the tangent plane TP at the point A.

Here, the angle between the reference plane RP of the reflector 1 and the tangent plane TP at the point A is defined as the "inclination angle θ at the point A". Then, the distribution of the reflection direction of the reflected light $L_{REF}$ is dependent on the inclination angle θ. Therefore, it is important that the viewer P evaluates subjectively the brightness of the reflector 1 and that the inclination angle θ is determined in such a way that the viewer P recognizes the reflection state as sufficiently bright one.

Figure 6A:
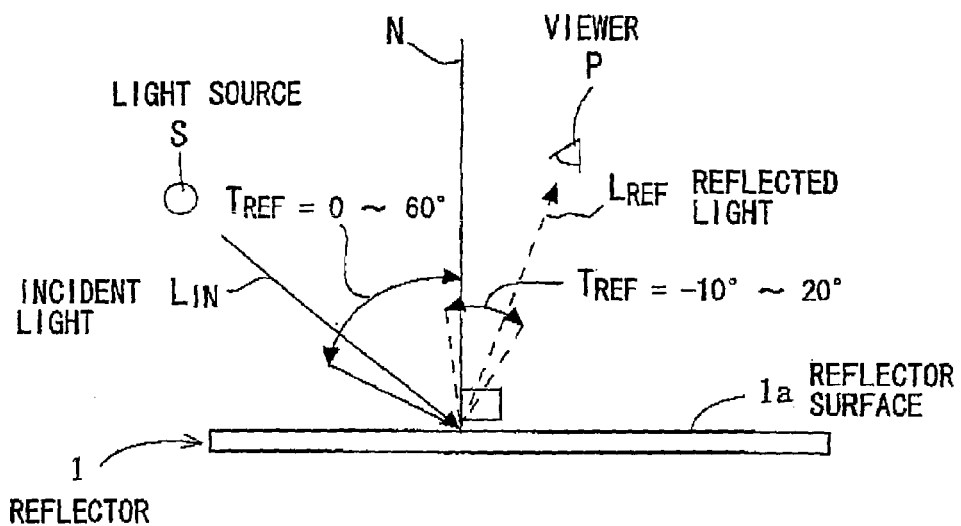
FIG. 6A is a schematic side view showing the relationship between the incident light, the viewer, and the reflector according to the embodiment of the invention.
Figure 6B:
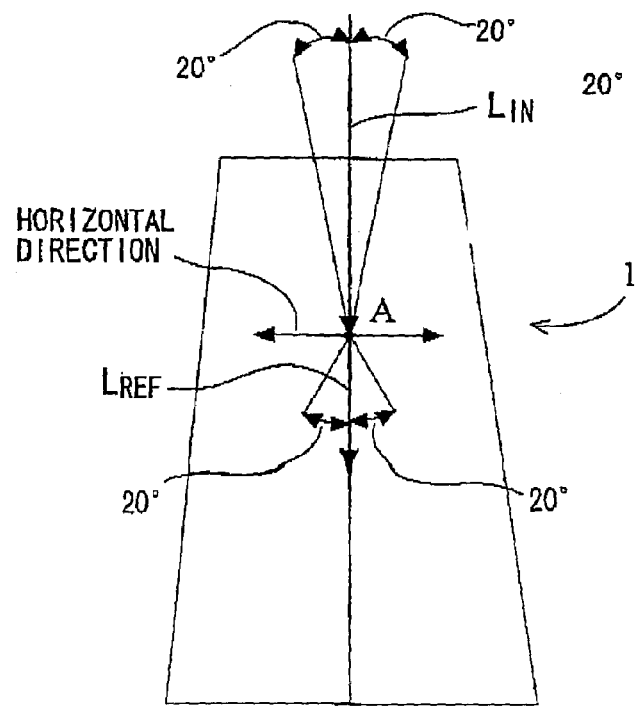
FIG. 6B is a schematic perspective view showing the relationship between the incident light, the viewer, and the reflector according to the embodiment of the invention.

Considering the state of actual use of the LCD device 10, it is thought that the situations as shown in FIGS. 6A and 6B are dominant. In the situation of FIG. 6A, the incident angle $T_{IN}$ is within the range from 0° to −60° while the reflection angle $T_{REF}$ is within the range from −10° to 20°. In the situation of FIG. 6B, the incident angle $T_{IN}'$ in the horizontal direction is within the range from −20° to 20° while the reflection angle $T_{REF}'$ in the horizontal direction is within the range from −20° to 20°.

If the percentage or proportion of the protrusions with elongated plan shapes extending in the horizontal direction from the viewpoint of the viewer P is increased, the reflector 1 can be designed to have a satisfactory directionality in such a way that the incident light $L_{IN}$ from the light source S is effectively turned to the reflected light $L_{REF}$ traveling toward the viewer P. As a result, the reflector 1 can be suitable to the situation of FIGS. 6A and 6B.

Next, a method of designing the protrusion pattern of the surface 1a of the reflector 1 is explained below.

Figure 7:
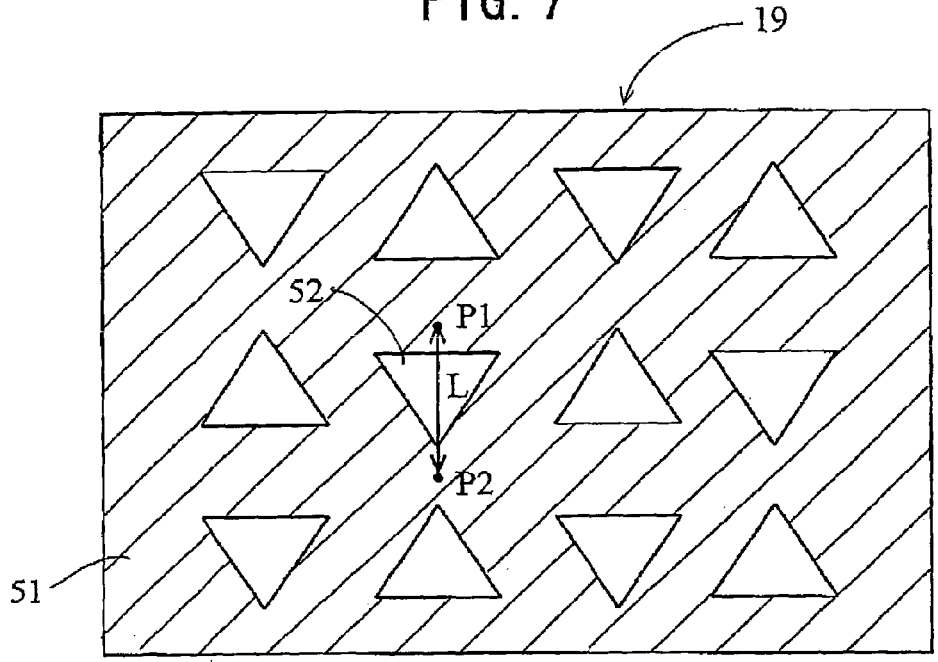
FIG. 7 is a schematic plan view showing the protrusion pattern of the second dielectric layer formed to cover the underlying protrusions in the LCD device of FIG. 3, which is substantially the same as the protrusion pattern of the reflector according to the embodiment of the invention.

FIG. 7 shows an example of the protrusion pattern of the second dielectric layer 19 formed to cover the underlying protrusions 18 in the LCD device 10 of FIG. 3. Since the Al layer (i.e., the reflector electrode 20) formed on the layer 19 is very thin, the protrusion pattern of the reflector 1 according to the embodiment is substantially the same as that of the layer 19.

In FIG. 7, the hatched area 51 denotes the protrusions of the surface of the second dielectric layer 19 while the non-hatched triangular areas 52 denote depressed areas thereof. The protrusions 51, which are approximately linear, are connected to each other. Actually, the depressed areas 52 are arranged at a specific level of disorder.

In FIG. 7, the edges of the protrusions 51 constitute the sides of the triangular depressed areas 52. In other words, approximately linear protrusions 51, which are unified together, constitute the triangular depressed areas 52. However, the invention is not limited this. It is sufficient for the invention that approximately linear protrusions 51 constitute closed geometric shapes (e.g., triangle, rectangle, square, circle, or ellipse) corresponding to depressed areas 52.

Figure 8:
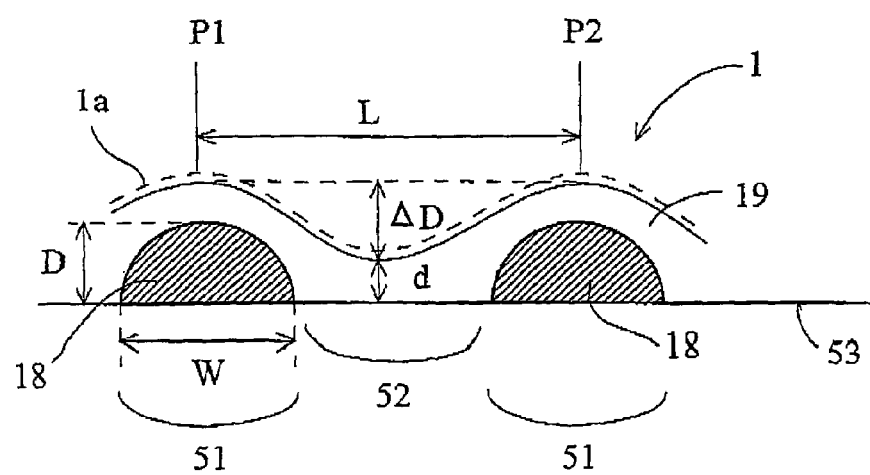
FIG. 8 is an enlarged, schematic cross-sectional view showing the detailed structure of the protrusion pattern of the second dielectric layer formed to cover the underlying protrusions in the LCD device of FIG. 3, which is substantially the same as the protrusion pattern of the reflector according to the embodiment of the invention.

FIG. 8 schematically shows the partial cross section of the second dielectric layer 19 and the protrusions 18 in the device 10 between the points P1 and P2 in FIG. 7. The protrusions 51 of the layer 19 are formed by the corresponding protrusions 18 of the device 10. The depressed areas 52 of the layer 19 are formed by the corresponding depressed areas between the adjoining protrusions 18.

In FIG. 8, the distance between the adjoining protrusions 18 is defined as L, and the width and height of the protrusions 18 are defined as W and D, respectively. The minimum height of the second dielectric layer 19 is defined as d. The height D and the minimum height d are measured with reference to the reference plane 53. The plane 53 is determined as a plane in which the height of the layer 19 is minimum. The height difference of the layer 19 between the maximum and minimum points is defined as ΔD.

Although the reflector electrode 20 is formed on the second dielectric layer 19, it is omitted from FIG. 8. This is because the electrode 20, which is made of the Al film, is actually very thin.

To subjectively evaluate the effect of the reflector 1, the inventors fabricated samples of the reflector 1 as shown in FIGS. 7 and 8 while changing the values of L, W, D, d, and ΔD. Thereafter, they built the samples thus fabricated into the LCD device 10 of FIG. 3 and evaluated subjectively the brightness and interference thereof. The result of this subjective evaluation test is shown in Table 1 below.

TABLE 1

| | D (μm) | d (μm) | Brightness | Interference |
|---|---|---|---|---|
| Triangle L = 24 μm W = 5 μm | 3.0 | 1.5 | ○ | ○ |
| | | 1.0 | ○ | ○ |
| | | 0.5 | X | Δ |
| | 2.0 | 1.0 | ○ | X |
| | | 0.5 | Δ | X |
| Triangle L = 18 μm W = 3 μm | 3.0 | 1.5 | ○ | ○ |
| | | 1.0 | ○ | ○ |
| | | 0.5 | Δ | Δ |
| | 2.0 | 1.5 | Δ X | Δ |
| | | 1.0 | ○ | Δ |
| | | 0.5 | Δ | X |
| | 1.5 | 1.0 | Δ Δ | X |
| | | 0.5 | X | X |
| Triangle L = 12 μm W = 3 μm | 3.0 | 1.5 | ○ | ○ |
| | | 1.0 | ○ | ○ |
| | | 0.5 | ○ | ○ |
| | 2.0 | 1.0 | ○ | ○ |
| | | 0.5 | ○ Δ | ○ |
| | 1.5 | 1.0 | Δ | Δ |
| | | 0.5 | Δ | Δ |

As the result of the subjective evaluation test shown in Table 1, it is seen that satisfactory brightness is obtainable in the conditions specified in the following Tables 2 and 3.

TABLE 2

| D | W |
|---|---|
| 3 μm | 5 μm or less |
| 2 μm | 3 μm or less |
| 1 μm | 2 μm or less |

TABLE 3

| ΔD | d | L |
|---|---|---|
| 1 μm | 2 μm | 20 μm or less |
| 1 μm | 1 μm | 15 μm or less |
| 1 μm | 0.5 μm | 10 μm or less |

From the above-described inventors' test, it was found that the relationship of $$0.5 \leq (D/W) \leq 1.0$$

is perferably satisfied. The shape of the protrusions 51 (18) is determined by the ratio of the height D of the protrusions 51 (18) to the width W thereof, i.e., (D/W), which determines the curvature of the protrusions 51 (18). Therefore, the distribution of the values of the inclination angle θ (see FIG. 5B) can be designed as desired. If the ratio (D/W) is greater than 1.0, the value of the angle θ is likely to be too large. If the ratio (D/W) is less than 0.5, the value of the angle θ is likely to be too small.

Moreover, it was found that the relationship of $$(1/20) \leq (d/L) \leq (1/5)$$

is preferably satisfied. The shape of the bumpy surface of the second dielectric layer 19 is determined by the ratio of the minimum height d of the protrusions 18 the inter-center distance L thereof, i.e., (d/L), which determines the curvature of the surface of the layer 19. Therefore, the distribution of the values of the inclination angle θ can be designed as desired. If the ratio (d/L) is greater than 1/5, the value of the angle θ is likely to be too large. If the ratio (d/L) is less than 1/20, the value of the angle θ is likely to be too small.

Furthermore, it was found that the relationship of $$(D/d) \leq 3$$

is preferably satisfied. The shape of the bumpy surface of the second dielectric layer 19 is determined by the ratio of the minimum height d of the layer 19 to the height D thereof, i.e., (D/d), which determines the curvature of the surface of the layer 19. Therefore, the distribution of the values of the inclination angle θ can be designed as desired. If the ratio (D/d) is greater than 3, the value of the angle θ is likely to be too large.

Figure 9:
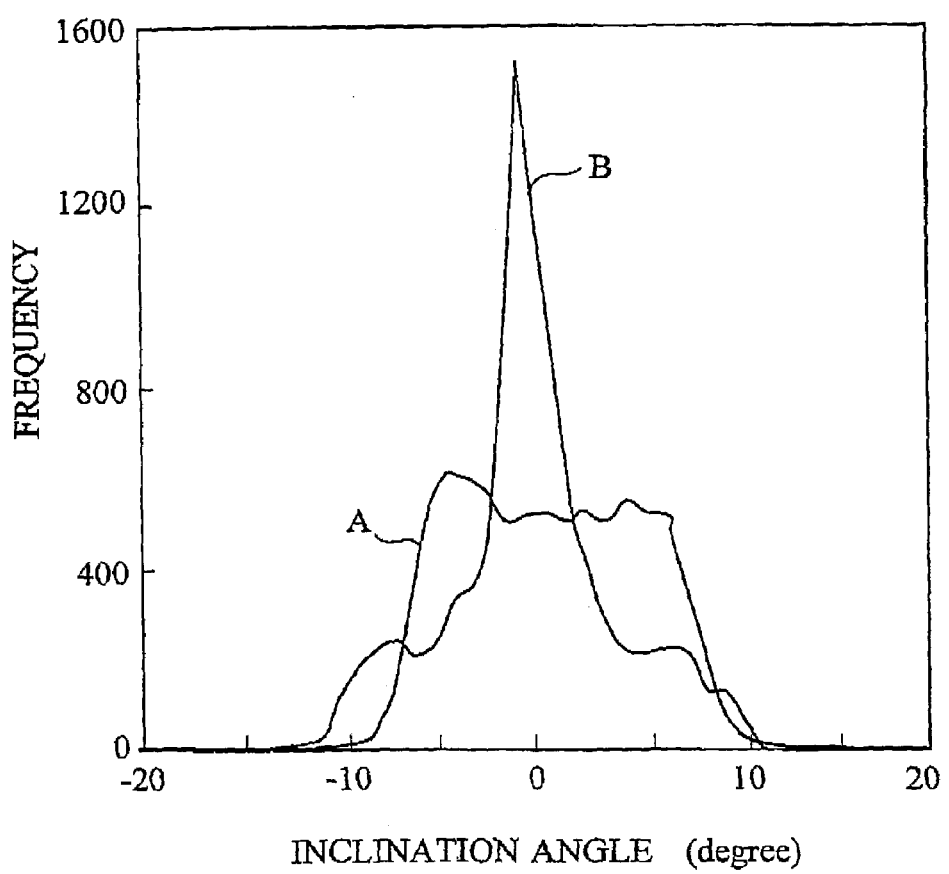
FIG. 9 is a graph showing the distribution of the incident angle values of the protrusions of the samples of the reflector.

FIG. 9 shows the distribution of the inclination angle θ of the good reflectors 1 (the reflector electrodes 20) and the bad ones from the result of the above-described subjective evaluation test. As seen from the curve A for the good ones, 50% or greater of the measured values of the inclination angle θ are within the range from 2° to 10°. On the other hand, as seen from the curve B for the bad ones, 15% or greater of the measured values of the inclination angle θ were 0°.

When the bottom of the second dielectric layer 19 having the minimum height d and/or the top of the layer 19 having the maximum height (d+ΔD) is/are wide, it/they tend(s) to be partially flat. In this case, to decrease the total area (i.e., size) whose measured value of the inclination angle θ is 0° to 15% or less, it is necessary that the height distribution of the second dielectric layer 19 (i.e., the bumpy surface 1a of the reflector 1) are not maximized at both the top and bottom of the layer 19.

As explained above, if the distribution of the values of the inclination angle θ is well controlled by adjusting the values of D, W, ΔD, d and L, desired directionality of the reflected light $L_{REF}$ toward the viewer P can be given to the LCD device 10, thereby improving the brightness in the direction toward the viewer P.

Next, the change of color tone due to the optical-path length difference is explained below.

When collimated optical beams are irradiated to the bumpy surface 1a of the reflector 1 to generate bright spots arranged at a specific pitch, optical interference will occur, if specific difference exists in the optical path lengths of the adjoining beams of the reflected light $L_{REF}$.

Here, the "bright spots" means the positions on the surface 1a of the reflector 1 the viewer P recognizes bright due to reflection of the beams of the incident light $L_{IN}$ at the surface 1a. In one case, optical interference occurs between the triangular depressed area 52 and the adjoining protruding part 51. In another case, optical interference occurs between the adjoining triangular depressed areas 52 or between the adjoining protruding parts 51.

Typically, the pitch m of the depressed area 52 and the adjoining protruding part 51 is approximately 3 μm, the pitch of the adjoining protruding parts 51 is approximately 10 μm, and the height difference h between the depressed area 52 and the adjoining part 51 is approximately 0.5 μm. Therefore, here, it is supposed that the pitch m is much greater than the height difference h, i.e., m>>h, and thus, the height difference h is ignored for simplification in the following explanation for simplification.

Figure 10:
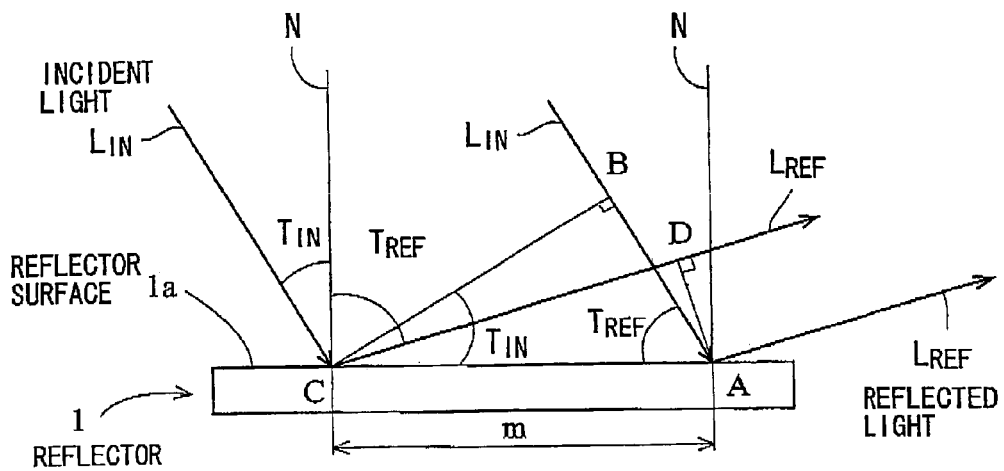
FIG. 10 is a schematic side view explaining the cause of optical interference in the reflector according to the embodiment of the invention.

FIG. 10 schematically shows the optical paths of the beams of the incident light $L_{IN}$ and the beams of the reflected light $L_{REF}$, where the inclination angle θ at the points A and C is equal and the reflected beams $L_{REF}$ are in the same direction as the incident beams $L_{IN}$.

The difference ΔL between the optical path lengths passing through the points A and C is expressed as follows using the reference characters shown in FIG. 10.

$$\Delta L = CD - AB = m(\sin T_{IN} - \sin T_{REF})$$

Here, the wavelength of the incident beams $L_{IN}$ is defined as λ. Then, the phase difference δ of the adjoining reflected beams $L_{REF}$ that cause optical interference satisfies the following equation, where n is a natural number.

$$\delta = n(2\pi/\lambda) \cdot \Delta L = n(2\pi/\lambda) \cdot m(\sin T_{REF} - \sin T_{IN})$$

As a result, the intensity I of the resultant, overall reflected light $L_{REF}$ to be observed by the viewer P is given by the following equation, where $I_0$ is the amplitude of the non-alternating component and $I_i$ is the amplitude of the alternating component.

$$I = I_0 + I_i \cos \delta$$

As a result, the intensity I of the resultant reflected light varies dependent on the wavelength λ of the incident beams $L_{IN}$. This means that the viewer P recognizes the light of a wavelength strongly and the light of another wavelength weakly. In other words, the images the viewer P recognizes on the screen of the device 10 includes conspicuous change of color tone.

According to the result of the above-described subjective evaluation test shown in Table 1, satisfactory brightness was obtainable under the following condition.

TABLE 4

| ΔD | d | L |
|---|---|---|
| 1 μm | 2 μm | 20 μm or less |
| 1 μm | 1 μm | 14 μm or less |
| 1 μm | 0.5 μm | 7 μm or less |

It was found that the relationship of $$(d/L) > (1/15)$$

is preferably satisfied.

If the incident light $L_{IN}$ with the wavelength λ of 550 nm enters the surface 1a of the reflector 1 at the incident angle $T_{IN}$ of 30°, the emission or reflection angle $T_{REF}$ of the reflected light $L_{REF}$ that induces constructive interference is given as shown in Table 5, where the pitch m is used as a parameter.

TABLE 5

| m | 3 μm | 5 μm | 10 μm | 20 μm |
|---|---|---|---|---|
| Emission Angle of First Peak | 36.2° | 33.7° | 31.8° | 30.9° |

Actually, the first peak was found at the emission or reflection angle $T_{REF}$ of approximately 36°. Therefore, the effective value of the pitch m that induces no optical interference was greater than approximately 3 μm (i.e., m>3 μm). Since the pitch of the protruding parts 51 and that of the depressed areas 52 are approximately 10 μm, it was considered that optical interference is caused by the adjoining protruding part and the depressed area, and that the effect by the adjoining protruding parts 51 and the adjoining depressed areas 52 is ignorable.

Figure 11:
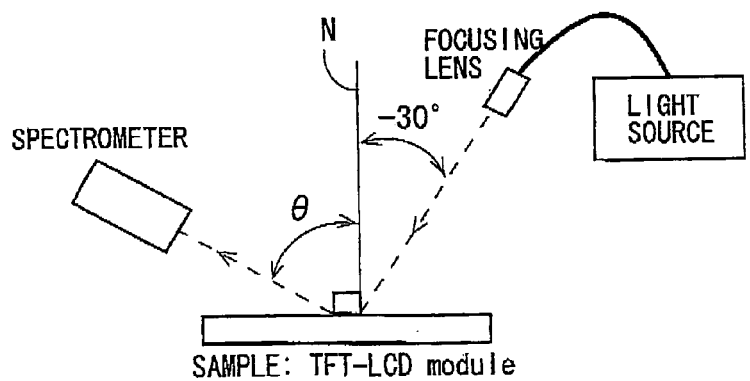
FIG. 11 is a schematic side view showing the method of measuring the optical characteristics of the reflector according to the embodiment of the invention.

FIG. 11 shows a method of measuring the optical characteristics of the reflector 1 according to the embodiment of the invention, which was carried by the inventors.

In this measuring method, white light was irradiated to a sample 1 or 2 of the reflector 1 at the incident angle of 30° and then, reflected light by the sample 1 or 2 at the emission or reflection angle of 0° to 60° was measured with a spectrophotometer IMUC (which was manufactured by Otsuka electronic Ltd. and the model name was LCD7000). Thus, the wavelength-brightness characteristic was obtained at each emission angle. The characteristic thus obtained was converted to the Y value indicating the brightness and the chromaticity coordinates (x, y) on the x,y chromaticity diagram.

The samples 1 and 2 were fabricated according to the conditions shown in Tables 6 and 7 below.

TABLE 6

| | Interference | Depressed Areas | Resin | D | d |
|---|---|---|---|---|---|
| Sample 1 | No | Triangular W = 5, L = 24 | PC339 | 2.7 μm | 1.2 μm |
| Sample 2 | Yes | Triangular W = 3, L = 18 | PC409 | 1.5 μm | 0.5 μm |

TABLE 7

| Reflector | Emission Angle Φ | Incident Slit to IMUC | ND Filter |
|---|---|---|---|
| White Reference Reflector | 0° | 0.2 | None |
| Sample 1 | 0°–60° | 0.2 | ND = 3% |
| Sample 2 | 0°–60° | 0.2 | ND = 3% |

Figure 12A:
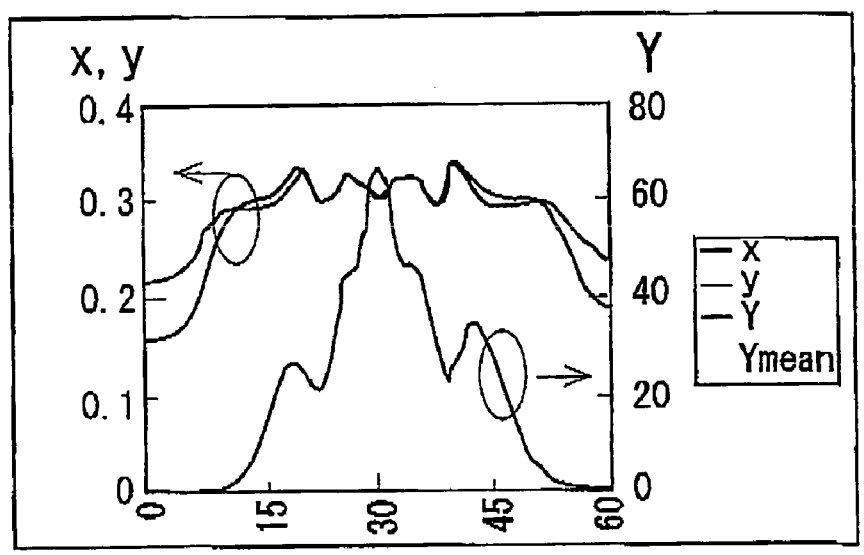
FIG. 12A is a graph showing the emission angle dependence of the brightness (Y) of the sample 1 of the reflector.
Figure 12B:
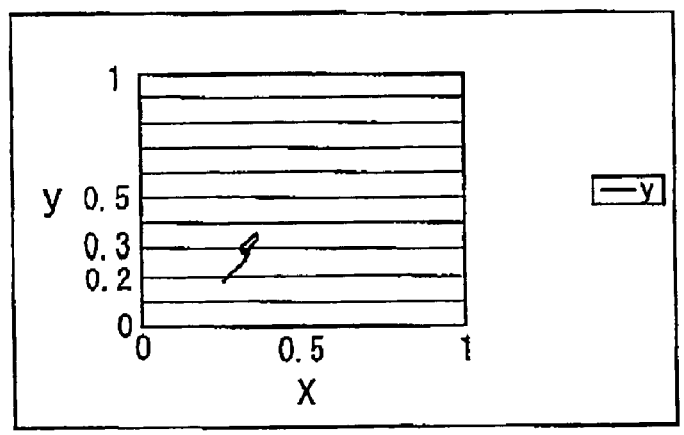
FIG. 12B is a graph showing the emission angle dependence of the color coordinates (x, y) of the sample 1 of the reflector.
Figure 12C:
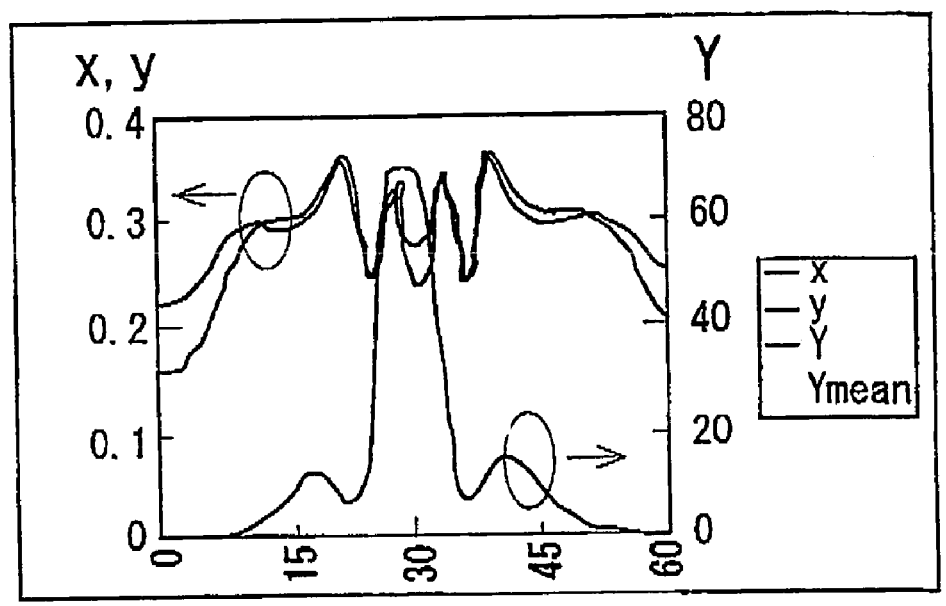
FIG. 12C is a graph showing the emission angle dependence of the brightness (Y) of the sample 2 of the reflector.
Figure 12D:
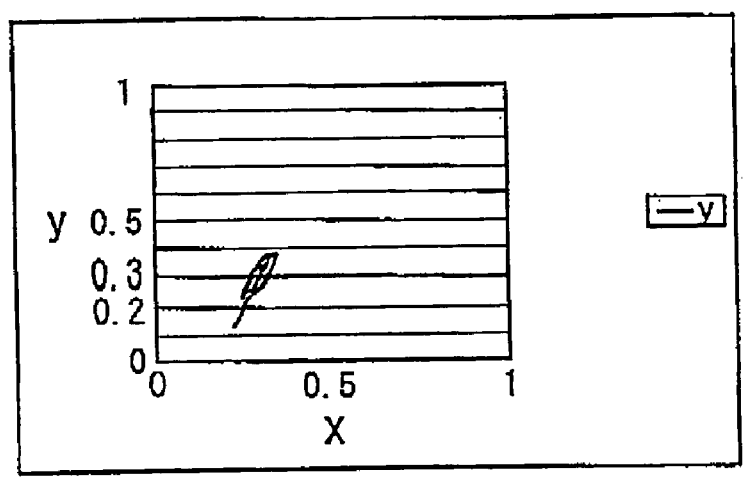
FIG. 12D is a graph showing the emission angle dependence of the color coordinates (x, y) of the sample 2 of the reflector.

FIGS. 12A and 12C show the emission (reflection) angle dependence of the Y value (i.e., brightness) and the chromaticity coordinates (x, y) of the samples 1 and 2, respectively. FIGS. 12B and 12D show the chromaticity coordinates (x, y) of the samples 1 and 2 plotted on the x,y chromaticity diagram, respectively.

As seen from FIGS. 12A to 12D, the sample 1 did not cause any interference while the sample 2 caused interference. It is difficult to recognize the level of strength of optical interference of the samples 1 and 2 from the variation of the Y value shown in FIGS. 12A and 12C. However, it is clearly recognized from the variation of the chromaticity coordinates (x, y) shown in FIGS. 12B and 12D as follows:

Specifically, the variation of (x, y) of the sample 1 is limited within the range where δx is less than approximately 0.05 and δy is less than approximately 0.05 (i.e., δx<approximately 0.05, δy<approximately 0.05). On the other hand, the variation of (x, y) of the sample 2 is limited within the range where δx is increased to approximately 0.1 and δy is increased to approximately 0.1 (i.e., δx<approximately 0.1, δy<approximately 0.1). Therefore, it is seen that the level of strength of optical interference of the sample 2 is higher than that of the sample 1.

With the sample 1, if the emission angle is changed, an approximately elliptic track was drawn within a circle with a radius of approximately 0.025 while setting the center of the circle at the coordinates of white, (0.31, 0.31), as shown in FIG. 12B. On the other hand, with the sample 2, if the emission angle is changed, an approximately elliptic track was drawn within a larger circle with a radius of approximately 0.05 than the sample 1 while setting the center of the circle at the same coordinates of white, as shown in FIG. 12D. As a result, to quantitatively measure the level of optical interference, it is necessary to measure not only the Y value but also the chromaticity coordinates (x, y).

Moreover, to recognize the permissible level of optical interference, it is necessary to draw a circle with a radius of 0.05 on the x,y chromaticity diagram while setting the center of the circle at the coordinates of white (0.31, 0.31), as shown in FIG. 13. In FIG. 13, R, G, and B denote the coordinates of red (R), green (G), and blue (B) colors, respectively.

Although the x and y coordinates of white is (0.31, 0.31) (i.e., x=y=0.31) in this embodiment, it is not limited to this in the invention. The x and y coordinates of white may be (0.29–0.33, 0.29–0.33), in other words, each of the x and y coordinates may be changed within the range of 0.29 to 0.33, according to the color temperature.

Figure 14A:
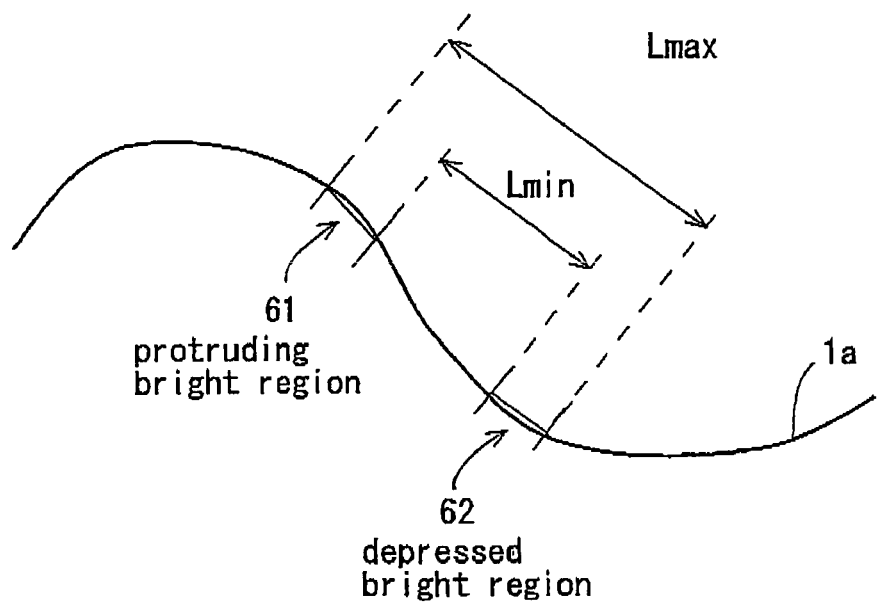
FIG. 14A is a schematic view showing the bright regions of the bumpy surface of the reflector according to the embodiment of the invention, where the protruding and depressed bright regions are comparatively narrow.
Figure 14B:
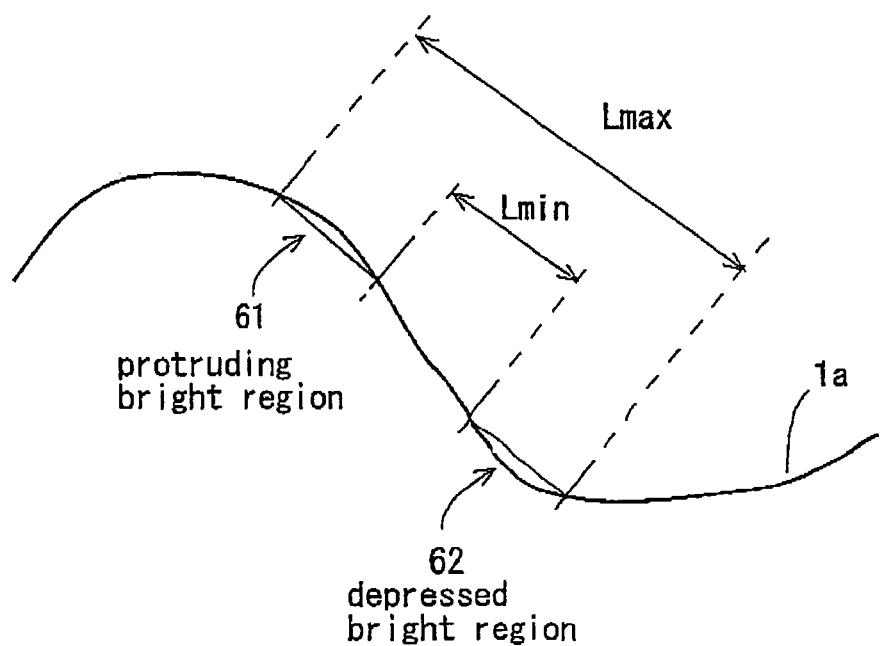
FIG. 14B is a schematic view showing the bright regions of the bumpy surface of the reflector according to the embodiment of the invention, where the protruding and depressed bright regions are comparatively wide.

FIGS. 14A and 14B show the protruding bright region 61 and the depressed bright region 62 of the same elemental shape (or, the protruding part 51 and the adjoining depressed area 52 in FIG. 7) of the reflector 1 of the embodiment, where these two bright regions 61 and 62 have approximately equal values of the inclination angle θ.

Since the protruding bright region 61 and the depressed bright region 62 have approximately the same inclination angles, optical interference will occur according to the model of FIG. 10. The regions 61 and 62 have specific scope wider than a spot and thus, the phase difference of the overall reflected light is formed by superposition of the reflected light beams at all the protruding and depressed bright regions 61 and 62 of the reflector 1.

Here, the minimum and maximum distances between the protruding bright region 61 and the adjoining depressed bright region 62 are defined as $L_{min}$ and $L_{max}$, respectively. The mean distance between the regions 61 and 62 is defined as $L_{mean}=(L_{min}+L_{max})/2$. In this case, the dispersion of the regions 61 and 62 is given as $(L_{max}+L_{min})/L_{mean}$. It is preferred that the dispersion of the bright regions 61 and 62, i.e., $[(L_{max}+L_{min})/L_{mean}]$, is designed to cancel the dispersion of the wavelength.

If the minimum distance d of the second dielectric layer 19 and the inter-center distance L of the protruding parts 51 satisfy the relationship of (d/L)>(1/15), the curvature of the bumpy surface 1a of the reflector 1 can be determined well. This means that the inclination angles of the regions 61 and 62 can be designed as desired. If (d/L) is equal to or less than (1/15), the inclination angle is likely to be too large and the curvature be too small, resulting in the dispersion of the bright regions 61 and 62 being too small. Thus, it is preferred that the relationship of (d/L)>(1/15) is satisfied.

Figure 15A:
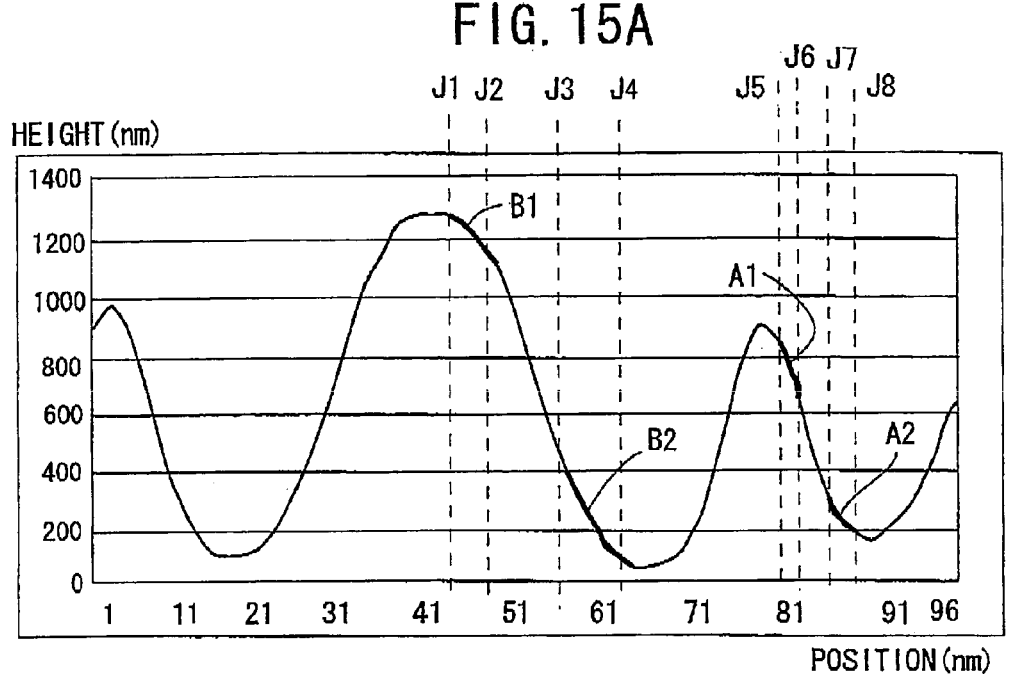
FIG. 15A is a graph showing the distribution of the height of the bumpy surface of the reflector according to the embodiment of the invention, as a function the position or distance.
Figure 15B:
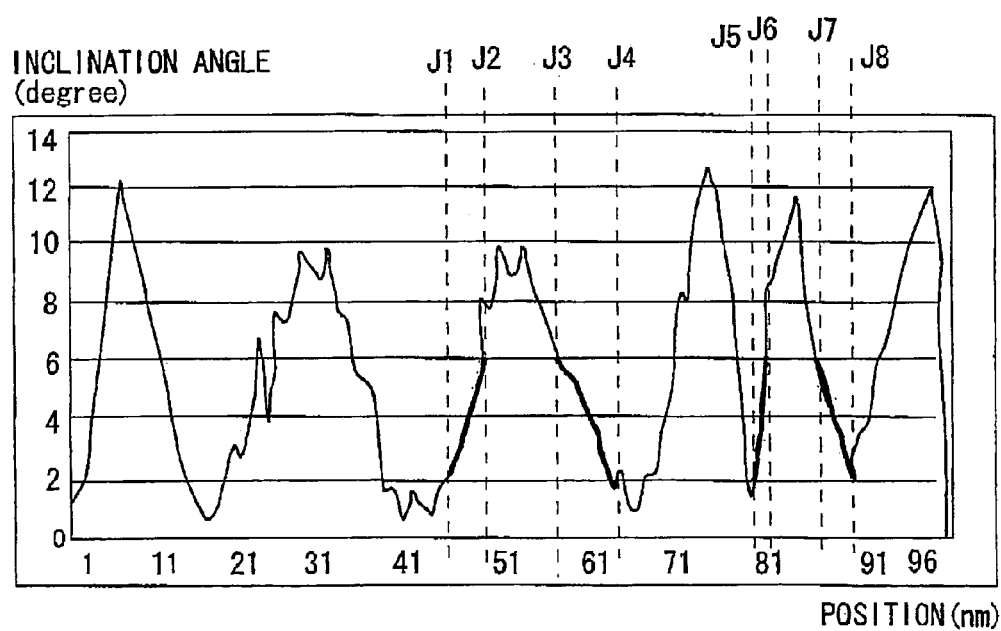
FIG. 15B is a graph showing the distribution of the inclination angle of the bumpy surface of the reflector according to the embodiment of the invention, as a function the position or distance.

The inventors measured the surface roughness of the reflector 1 having the roughening pattern of in FIG. 7 along the line connecting the points P1 and P2 (i.e., the line P1P2). The result of this measurement is shown in FIGS. 15A and 15B. FIG. 15A shows the height change of the surface 1a as a function of the distance along the line P1P2. FIG. 15B shows the inclination angle change of the surface 1a as a function of the distance along the line P1P2.

In FIG. 15A, the bold lines A1, A2, B1, and B2 on the curve denote the areas having the inclination angle from 2° to 6°. The bold lines A1 and A2 correspond to the bright regions 61 and 62 near the corner of the triangular depressed area 52 in FIG. 7, respectively. The bold lines B1 and B2 correspond to the bright regions 61 and 62 near the base of the triangular area 52 in FIG. 7, respectively.

With the bright regions 61 and 62 corresponding to the lines A1 and A2 near the corner of the area 52, $L_{max}$=10 μm and $L_{min}$=3.5 μm. Therefore, the dispersion (ΔL/L) of the bright regions 61 and 62 is given by the following equation.

$$(\Delta L/L) = (L_{max} - L_{min})/L_{mean} = (10-3.5)/6.5 = 1.0$$

On the other hand, the dispersion $(\Delta\lambda/\lambda)$ of the wavelength $\lambda$ of the reflected light $L_{REF}$ is given by the following equation.

$$(\alpha\lambda/\lambda) = (\lambda_{max} - \lambda_{min})/\lambda = (550-450)/500 = 0.2$$

This value of wavelength dispersion of 0.2 can be effectively canceled by the value of the dispersion of the bright regions 61 and 62 of 1.0.

With the bright regions 61 and 62 corresponding to the lines B1 and B2 near the base of the area 52, $L_{max}=4$ μm and $L_{min}=3$ μm. Therefore, the dispersion $(\Delta L/L)$ of the bright regions 61 and 62 is given by the following equation.

$$(\Delta L/L) = (L_{max} - L_{min})/L_{mean} = (4-3)/3.5 \approx 0.3$$

Thus, the value of wavelength dispersion of 0.2 is not effectively canceled by the value of the dispersion of the bright regions 61 and 62 of approximately 0.3.

Accordingly, with the reflector 1 having the roughening pattern of FIG. 7 where the triangular depressed areas 52 are regularly arranged, optical interference can be suppressed near the corner of each area 52. Thus, the overall change of color tone of the reflector 1 due to optical interference can be decreased.

Figure 16:
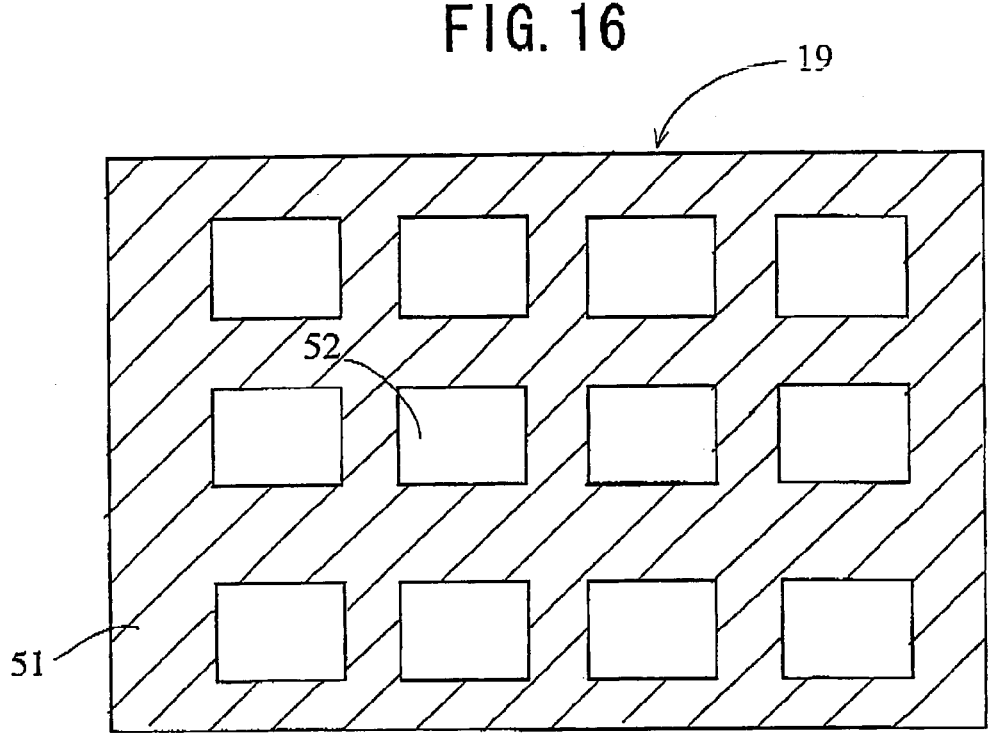
FIG. 16 is a schematic plan view showing a variation of the protrusion pattern of the second dielectric layer formed to cover the underlying protrusions in the LCD device of FIG. 3.
Figure 17:
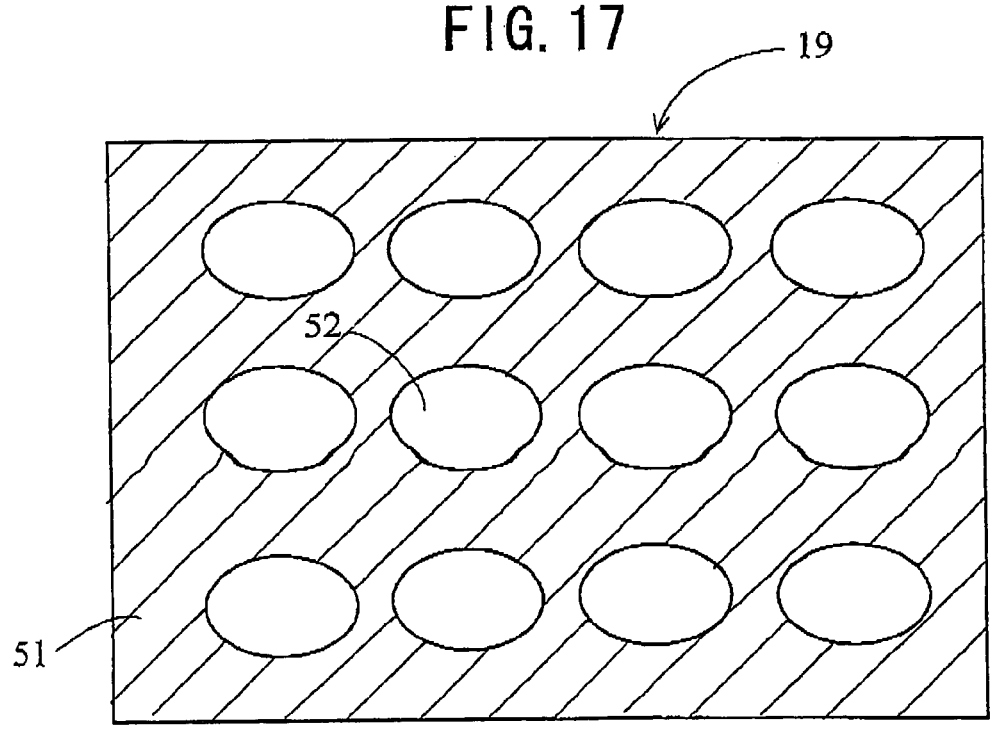
FIG. 17 is a schematic plan view showing another variation of the protrusion pattern of the second dielectric layer formed to cover the underlying protrusions in the LCD device of FIG. 3.

Although the reflector 1 of the above-described embodiment, the roughening pattern comprises triangular depressed areas 52, each area 52 may have any closed geometric shape other than triangle, e.g., rectangle or ellipse, as shown in FIGS. 16 and 17.

As explained above, with the above-described reflector 1 of the embodiment of the invention, the inclination angle of the protruding bright regions 61 and the depressed bright regions 62 are controlled With the reflector 1 for the reflection-type LCD device 10 according to the embodiment of the invention, the roughened surface 1a of the reflector 1 has the protrusion pattern that gives inclination angle to the surface 1a according to the specific distribution. The distribution is determined in such a way that the first component with an inclination angle value θ of 0° is 15% or less in area and the second component with an inclination angle value θ from 2° to 10° is 50% or greater in area. Thus, the proportion of the reflected light $L_{REF}$ traveling in a specific direction is increased. This means that the amount of the component of the reflected light $L_{REF}$ that travels toward the viewer is increased. Accordingly, the incident light $L_{IN}$ is efficiently reflected by the roughened surface 1a of the reflector 1 of the embodiment to the viewer's side.

Also, the distribution of the incident angle values can be easily designed in such a way that the amount of the component of the reflected light that travels toward a viewer is increased.

The visibility is improved over the whole surface of the reflector.

Moreover, since the specific distribution of the inclination angle values of the roughened surface 1a has an average value within a range from 2° to 6°, there is an additional advantage that the reflector can be fitted to a typical arrangement of light source in a circumstance or situation where the reflector is used, thereby optimizing the reflection efficiency.

If the roughened surface 1a of the reflector 1 has the protrusion pattern that gives a variation range of chromaticity coordinates (x, y) on the chromaticity diagram dependent on the angle of view, and the variation range is limited in the circle on the chromaticity diagram, where the circle has a radius of approximately 0.05 and a center at a point corresponding to white color, optical interference can be suppressed effectively. This means that the variation of color tone due to optical interference can be suppressed. Moreover, the optical characteristics of the reflector 1 can be easily known with a measuring apparatus, not with labor, by way of measuring the variation of chromaticity coordinates (x, y) on the chromaticity diagram.

FIGS. 16 and 17 show variations of the protrusion pattern of the second dielectric layer 19 formed to cover the underlying protrusions 18 in the LCD device 10 of FIG. 3. In the above-described embodiment, the depressed areas 52 are triangular. Unlike this, the depressed areas 52 are rectangular in the variation of FIG. 16 while the depressed areas 52 are elliptic in the variation of FIG. 17. In these variations, the same advantage as those in the above-embodiment is obtainable.

VARIATIONS

Needless to say, the present invention is not limited to the above-described embodiment. Any change or modification may be added to the embodiment within the spirit of the invention. For example, although the reflector 1 comprises the protrusions 18, the second dielectric layer 19, and the reflector electrode 20 in the LCD device of the above embodiment, it may have any other structure than this.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A reflector for a reflection-type LCD device, comprising:
    a roughened surface having a protrusion pattern;
    the protrusion pattern giving a variation range of chromaticity coordinates (x, y) on a chromaticity diagram dependent on an angle of view; and
    the variation range being limited in a circle on the chromaticity diagram, where the circle has a radius of approximately 0.05 and a center at a point corresponding to white color.

2. The reflector according to claim 1, further comprising protrusions arranged in such a way that depressed areas are formed among adjoining ones of the protrusions;
    a first bumpy layer formed to cover the protrusions; and
    a base layer of the reflector formed on the first layer;
    wherein each of the depressed areas has a closed geometric shape;
    and wherein the first layer has a bumpiness generated by the protrusions;
    and wherein the base layer has a bumpiness corresponding to the bumpiness of the first layer, thereby forming the protrusion pattern of the surface of the reflector.

3. The reflector according to claim 2, wherein the closed geometric shape of each of the depressed areas is like one selected from the group consisting of triangle, rectangular, and ellipse.

4. The reflector according to claim 2, wherein the first bumpy layer has a minimum height d and the protrusions have an inter-center distance L, where the minimum height d and the inter-center distance L have a relationship of $(1/15) \leq (d/L)$.

5. The reflector according to claim 1, wherein the protrusion pattern gives a specific distribution of inclination angle values to the surface;

and wherein when incident light is irradiated to the surface of the reflector, bright regions with specific extent are generated, each of which has an inclination angle value within a range from 2° to 6°.

6. The reflector according to claim 5, wherein when minimum and maximum distances between the protruding bright region and the adjoining depressed bright region are defined as $L_{min}$ and $L_{max}$, respectively, and a mean distance between the protruding and depressed bright regions is defined as $L_{mean}=(L_{min}+L_{max})/2$, a relationship of $$(L_{min}-L_{max})L_{mean} \geqq 0.2$$

is established.

7. The reflector according to claim 2, wherein the closed geometric shape of each of the depressed areas is like one selected from the group consisting of triangle, rectangular, and ellipse.

8. A reflection-type LCD device comprising one of the reflectors according to claim 1.

* * * * *